(12) United States Patent
Leon et al.

(10) Patent No.: US 7,558,869 B2
(45) Date of Patent: Jul. 7, 2009

(54) RATE ADAPTATION METHOD AND DEVICE IN MULTIMEDIA STREAMING

(75) Inventors: David Leon, Irving, TX (US); Viktor Varsa, Irving, TX (US); Ru-Shang Wang, Coppell, TX (US); Igor Danilo Diego Curcio, Tampere (FI); Emre Baris Aksu, Tampere (FI)

(73) Assignee: Nokia Corporation, Espoo (FI)

( * ) Notice: Subject to any disclaimer, the term of this patent is extended or adjusted under 35 U.S.C. 154(b) by 674 days.

(21) Appl. No.: 10/778,899

(22) Filed: Feb. 13, 2004

(65) Prior Publication Data

US 2004/0193762 A1 Sep. 30, 2004

Related U.S. Application Data

(60) Provisional application No. 60/448,299, filed on Feb. 14, 2003, provisional application No. 60/448,284, filed on Feb. 14, 2003, provisional application No. 60/448,309, filed on Feb. 14, 2003, provisional application No. 60/447,264, filed on Feb. 13, 2003.

(51) Int. Cl.
*G06F 15/16* (2006.01)
*H04L 12/28* (2006.01)

(52) U.S. Cl. .................. 709/231; 709/200; 709/203; 370/235; 370/395.6

(58) Field of Classification Search .................. 709/200, 709/203, 231; 370/235, 395.6
See application file for complete search history.

(56) References Cited

U.S. PATENT DOCUMENTS

| | | | | |
|---|---|---|---|---|
| 5,565,924 A | * | 10/1996 | Haskell et al. | 348/423.1 |
| 5,640,388 A | * | 6/1997 | Woodhead et al. | 370/468 |
| 5,703,793 A | * | 12/1997 | Wise et al. | 382/232 |
| 5,881,245 A | * | 3/1999 | Thompson | 709/219 |
| 5,999,226 A | * | 12/1999 | Choi | 348/564 |
| 6,292,834 B1 | * | 9/2001 | Ravi et al. | 709/233 |
| 6,570,872 B1 | * | 5/2003 | Beshai et al. | 370/369 |
| 6,904,045 B1 | * | 6/2005 | Chiussi et al. | 370/412 |
| 6,937,770 B1 | * | 8/2005 | Oguz et al. | 382/235 |
| 2003/0035374 A1 | * | 2/2003 | Carter et al. | 370/235 |
| 2003/0193619 A1 | * | 10/2003 | Farrand | 348/731 |
| 2004/0098748 A1 | * | 5/2004 | Bo et al. | 725/105 |

(Continued)

OTHER PUBLICATIONS

3GPP TS 26,234 V5.0.0; "Transparent end-to-end packet with switched streaming service (PSS), Protocols and codecs"; Annex G pp. 74-76; Mar. 2003.
3GPP TSG-SA WG4 Meeting #25; Tdoc S4 (03)0024, "End-to-End bit rate adaptation for PSS"; pp. 1-9; Jan. 2003.

(Continued)

*Primary Examiner*—Alina N Boutah
(74) *Attorney, Agent, or Firm*—Ware, Fressola, Van Der Sluys & Adolphson, LLP (57) ABSTRACT

A method for the client in a multimedia streaming network to control the receiver buffer fullness by way of effectively shifting the transmission clock in the server who provides streaming data to the client. In order to avoid buffer underflow or overflow, the client sends a message to the server requesting the shift of the transmission clock either forward or backward depending on whether the client wants to increase or decrease the receiver buffer. Based on the message, the server adjusts the data transmission amount by effectively shifting its transmission clock. The request from the client can be sent through RTCP or RTSP.

23 Claims, 4 Drawing Sheets

U.S. PATENT DOCUMENTS

| | | | | |
|---|---|---|---|---|
| 2004/0102942 A1* | 5/2004 | Rhodes | ........................ | 703/13 |
| 2004/0151382 A1* | 8/2004 | Stellenberg et al. | ......... | 382/219 |
| 2004/0193762 A1* | 9/2004 | Leon et al. | .................... | 710/52 |
| 2004/0267956 A1* | 12/2004 | Leon et al. | .................. | 709/231 |
| 2005/0254427 A1* | 11/2005 | Leon et al. | .................. | 370/235 |
| 2006/0165129 A1* | 7/2006 | Li et al. | ...................... | 370/503 |

OTHER PUBLICATIONS

Network Working Group, RFC 2068; Fielding et al.; "Hypertext Transfer Protocol—HTTP/1.1"; Section 4.2 pp. 31; Jan. 1997.
Network Working Group, RFC 2326; Schulzrinne et al.; "Real Time Streaming Protocol (RTSP)"; Sections 2 and 4, pp. 14, 19-20; Apr. 1998.

* cited by examiner

RATE ADAPTATION METHOD AND DEVICE IN MULTIMEDIA STREAMING

This patent application is based on and claims priority to U.S. Provisional Applications No. 60/447,264, filed Feb. 13, 2003; No. 60/448,309, filed Feb. 14, 2003; No. 60/448,284, filed Feb. 14, 2003 and No. 60/448,299, filed Feb. 14, 2003.

CROSS REFERENCES TO RELATED PATENT APPLICATIONS

This patent application is related to U.S. patent application Ser. Nos. 10/779,318 and 10/778,941, both assigned to the assignee of the present patent application and filed on even date herewith.

FIELD OF THE INVENTION

The present invention relates generally to multimedia streaming and, more particularly, to rate adaptation between a server and a client in multimedia streaming services.

BACKGROUND OF THE INVENTION

In a multimedia streaming service, there are three participants involved: a streaming server, a streaming client and a transmission channel or an underlying network. Usually it is the transmission channel that is the bottleneck of the service, both in terms of throughput and in terms of reliability (i.e., if no throughput bitrate guarantee is assumed), but throughput limitations can occur also at the client and/or at the server.

In a real-time streaming system, due to the dynamically changing throughput characteristics of the channel, client and server, the streaming delivery needs to be adaptive in order to maintain a real-time playback experience for the user. The server should adapt the transmission rate to the varying throughput of the system. An example of such a rate adaptation system can be found in Haskell et al. (U.S. Pat. No. 5,565,924, "Encoder/Decoder Buffer Control for Variable Channel").

The streaming client provides receiver buffering for storing incoming data before passing them to the media decoder for playout. The receiver buffer is used to compensate for the difference between source encoding rate (also referred to as sampling rate) and transmission rate (pre-decoder buffering). It is also used to compensate for the packet transfer delay variation over the channel (jitter buffering). In general, these two functions are assumed to be combined in a single receiver buffer. However, they can also be implemented with two separate buffers in a receiver, although such an implementation is not optimum from a delay point of view. Receiver buffering can also smooth out the adaptation inaccuracies (i.e. if the system throughput is not matched exactly by the server output).

If the receiver buffer becomes empty (i.e. buffer underflow), which means that the decoder is running out of data to decode, the client needs to pause playout and re-buffer incoming data before resuming. On the other hand, if the incoming data rate is faster than the playout rate, then the receiver buffer space can be exhausted (i.e., buffer overflow), which can result in dropping packets from the buffer in order to make room for new incoming packets. When the packets are dropped, the video quality is degraded. To ensure a smooth and flawless playout, the receiver buffer of the client should be kept within a certain fullness range. In order to guarantee that the receiver buffer will not underflow or overflow, the bitrate for transmission and sampling at the server and that for reception and playout at the client must be adequately controlled.

In the following discussions, bitrate control will be described with reference to the bitrate evolution plots (on the horizontal axis, time in seconds; on the vertical axis, cumulative amount of data in bytes or bits) in which the following curves are defined:

The playout curve, $P(t)$, shows the cumulative amount of data that the decoder has processed by a given time from the receiver buffer;

The sampling curve, $S(t)$, shows the progress of data generation as if the media encoder was run real-time (it is the counterpart of the playout curve, and is actually a time-shifted version of it);

The transmission curve $T(t)$, shows the cumulative amount of data sent out by the server at a given time; and The reception curve, $R(t)$, shows the cumulative amount of data received and placed into the client buffer at a given time.

Figure 1:
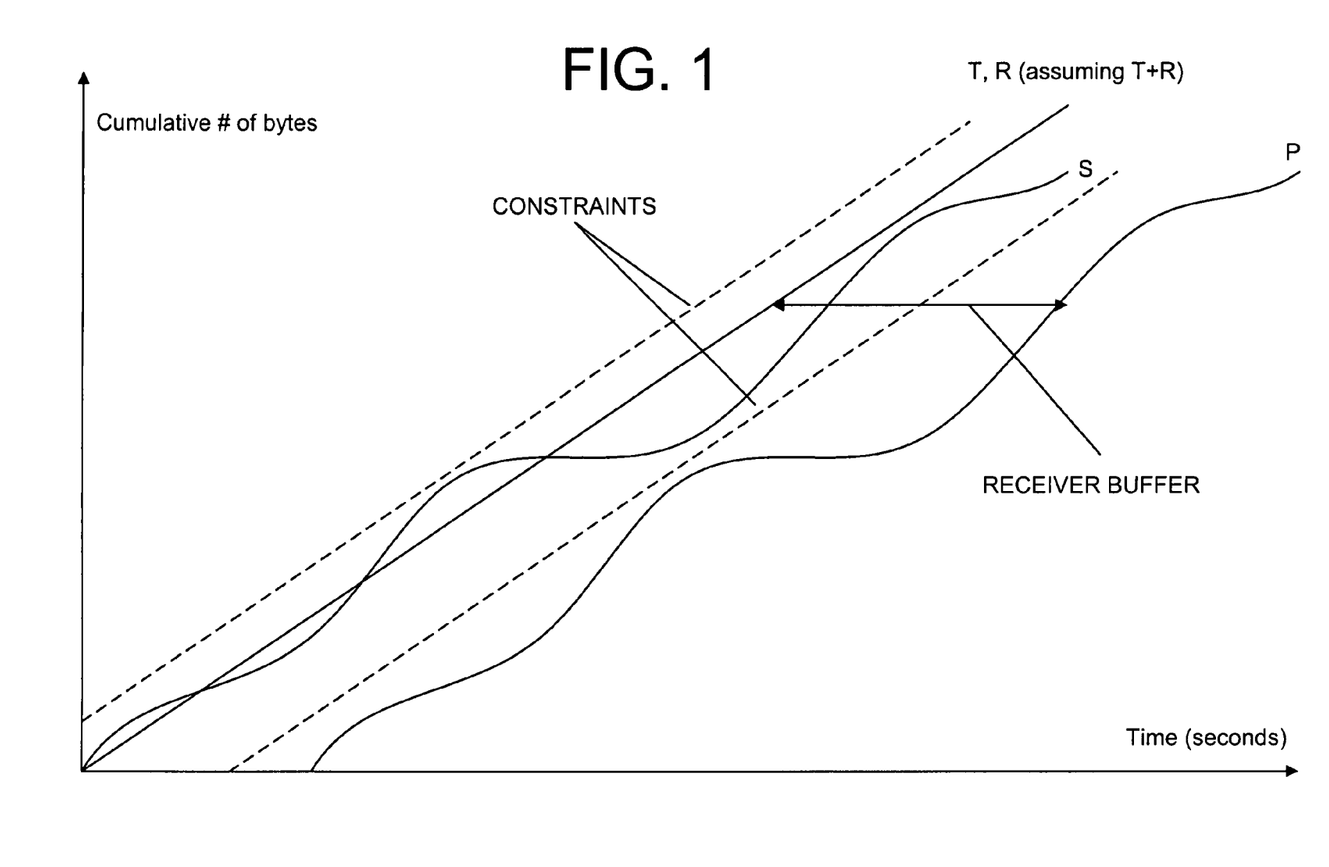
FIG. 1 is a plot showing different curves in a typical bitrate evolution plot.

The difference between any two curves defines the delay and "buffer size" between those two curves. The bitrate control will be constrained by some limits on the difference between two curves (e.g., max buffer size, or max delay). A typical bitrate evolution plot is shown in FIG. 1.

When determining the best arrangement for server and client cooperation in the bitrate control, the following is to be considered:

A. Sampling curve—the control (i.e., selection of the bitstream for transmission) should be left completely to the server because:

1) it is only the server who knows about the exact characteristics of each bitstream, e.g., switching positions, priority of frames, future frame sizes, and 2) there might not be a bitstream rate that matches the network bit rate, and the server could perform some "tricks" (e.g., thinning, switching up-and-down).

B. Transmission curve—the control (i.e., the rate at which to transmit) should be also left to the server (i.e., using RTCP (Real Time Control Protocol) reports or other bandwidth info from the client) because:

1) in general, it is only the server who can measure the amount of data on-wire, and 2) there might be a need to adapt the transmission rate to the sampling curve if the sampling curve control has limited flexibility.

The server should maintain some real-time constraints by adapting its sampling curve $S(t)$ to its transmission curve $T(t)$. Adaptation of the sampling curve to the transmission curve guarantees that, with adequate buffering, the receiver is able to play out the media with correct synchronization. At every time instant t, the sampling curve $S(t)$ should not deviate from the transmission curve $T(t)$ by too large an amount of bytes.

Mathematically, the constraints maintained by the server at every time instant t is given by $$-\epsilon \leq T(t) - S(t) \leq \epsilon' \quad (R1)$$

where epsilon ($\epsilon$) and epsilon_prime ($\epsilon'$) are positive numbers. Epsilon and epsilon_prime directly translate into physical constraints at the receiver. The larger the value "epsilon" (i.e., the more the sampling curve can exceed the transmission curve), the longer the amount of time the client needs to buffer initially in order to guarantee playout without pause. The larger the value "epsilon_prime" (i.e., the more the transmission curve can exceed the sampling curve), the more buffering space a client will need in order to avoid receiver buffer overflow.

If the server operates within a limit as defined by the real-time constraints, the client is responsible to provide any necessary buffering to follow the server within the limit. In that case, the client has to compensate for:

1) pre-decoder buffering for |S(t)−T(t)|, and
2) jitter buffering for transfer delay variation {T(t)−R(t)}.

In addition, the client must tolerate any mismatch between the playout curve and the sampling curve (e.g., clock drift or playback slowdown due to client platform operating system problem).

In a multimedia streaming system, a sender or server needs at each time instant to decide how to encode (at what rate) the following packet it will send and decide at what time to send it. In normal operations, the sender is able to maintain real-time playout by the receiver using only RTCP reports. The 3GPP (3rd Generation Partnership Project) Packet Switched Streaming Service (PSS) defines normative video buffering requirements, which are targeted to compensate for encoding and server-specific delay variations inherent in VBR (Variable Bit Rate) video compression and transmission (see 3GPP TS 26.234 V5.1.0, "Transparent End-to-End Packet Switched Streaming Service (PSS); Protocols and Codecs (Release 5)", June 2002, hereafter referred to as TS 26.234). When both streaming server and client comply with the buffering requirements, it is guaranteed that the client is able to play out the stream transmitted by the server without client buffer violation (i.e. there will be no buffer underflow or overflow at the client) provided that the stream from the server is transmitted over a constant-delay, reliable transmission channel. However, this is no longer possible under some circumstances such as handovers, retransmissions or clock drift. As a result, the sender and the receiver may take actions conflicting with each other, and a severe degradation in the user experience may occur.

In prior art, a receiver modifies its buffer level by the use of RTSP (Real Time Streaming Protocol) header fields speed (sub-sampling audio and or video) and scale (multiplicative increase or decrease of the bitrate). These headers are defined in IETF RFC2326. The receiver may also make use of bitrate switching commands by the client, as described in "End-to-End bit rate adaptation for PSS", 3GPP SA4 doc S4-030024.

SUMMARY OF THE INVENTION

While it is the server (sender) that needs to decide how to encode the following packet it will send and at what time to send it at each time instant, the client (receiver) has a way to influence its receiver buffer level. Client's influence can be accomplished either in a reactive manner (i.e., correction of mismatch of the playout curve and the sampling curve due to clock drift or other playout slowdown problem), or in a pro-active manner (i.e., controlling how much data to remain in the receiver buffer for the purpose of withstanding possible future long handovers without underflow). Accordingly, the receiver is able to instruct the sender to send the packets later than when the sender would have normally sent them, or send the packet earlier than when the sender would have normally sent them.

The present invention is applicable at least to two different situations:

In the first situation, a sender attempts to guarantee 'real-timeness' by aiming to send packets at the time given by their timestamp, and the receiver instructs the sender to send the packets later or sooner than their timestamp. In this situation, the effect of the present invention can be interpreted as shifting the transmission clock forward or backward. When the sender uses a clock ('transmission clock') to schedule the packets that it sends to the receiver, the sender would normally try to send at time t the packet whose timestamp is t. If the receiver wants the sender to send the packets later by an amount of time "alpha" (α), then the sender should try at time t to send the packet whose timestamp is t−α. If the receiver wants the sender to send the packets earlier by an amount of time "beta" (β), then the sender should try at time t to send the packet whose timestamp is t+β. Thus, the signaling of time "alpha" or "beta" causes an effective time-shift in the transmission clock.

In the second situation, the sender does not attempt to guarantee real-timeness, but the receiver is able to instruct the sender to increase and/or decrease the amount of data to be sampled over a given time period. In this situation, the effect of the present invention can be interpreted as byte shifting, instead of time-shifting. Instead of signaling the target delay in time or the shortening in time between the sampling curve and the transmission curve, the receiver can also signal the target difference in bytes between the sampling curve and the transmission curve.

The type of sampling curve control that is performed using the present invention can be qualified as 'cooperative sampling curve control'. This stems from the fact that while the receiver gives some targets for the sampling curve (i.e., control where the sampling curve should be with respect to the transmission curve), it is up to the sender to shape the actual curve to reach this target.

This can be contrasted with a purely sender-driven sampling curve control, where the sender estimates (or knows) what should be the receiver buffer level and how to shape the sampling curve accordingly (i.e., passive receiver, e.g. as in 3GPP TS 26.234 video buffering model).

It can also be contrasted with a purely receiver-driven sampling curve control, where the receiver dictates what should be the sampling rate at a given time instant, for example, by sending bitstream switch commands (i.e., passive sender, e.g. as in 3GPP SA4 doc S4-030024).

Thus, the first aspect of the present invention provides a method for adaptively controlling level of a receiver buffer in a client in a multimedia streaming network, the streaming network comprising a server for providing streaming data to the client, wherein the receiver buffer is used to compensate for difference between data transmission amount by the server and data usage amount by the client so as to allow the client to have sufficient amount of streaming data to play-out in a non-disruptive manner, and wherein the data transmission amount by the server is determined at least partially by a timestamp clock in the server for data transmission scheduling. The method comprises:

signaling to the server a message indicative of the receiver buffer level; and adjusting at the server the data transmission amount in reference to the timestamp clock, based on the message.

According to the present invention, the message comprises a time-shift message indicative of an effective time-shift on the timestamp clock so as to allow the server to adjust the data transmission amount in reference to the time-shifted timestamp clock.

According to the present invention, the time-shift can be in a direction to cause a decrease or in a direction to cause an increase in the level in the receiver buffer. According to the present invention, the message is further indicative of when the effective time-shift takes place: immediately, over a given period and no specified time.

According to the present invention, the message is further indicative of a maximum amount of the time-shift.

According to the present invention, the data transmission amount is also determined by a sampling rate in the server, and the message is used to change the sampling rate in the server so as to change the data transmission amount provided to the client.

Alternatively, the message comprises a byte-shift message indicative of a change of streaming data amount so as to allow the server to adjust the data transmission amount.

The message can be sent via Real Time Control Protocol or Real Time Streaming Protocol.

The second aspect of the present invention provides a multimedia streaming network, which comprises:

at least a client; and a server for providing streaming data to the client, the client comprising:

a receiver buffer to compensate for difference between data transmission amount by the server and data usage amount by the client so as to allow the client to have sufficient amount of streaming data to play-out in a non-disruptive manner, and wherein the data transmission amount by the server is determined at least partially by a timestamp clock in the server for data transmission scheduling, and a signaling mechanism for signaling to the server a message indicative of the receiver buffer level; and the server comprising:

a further signaling mechanism for receiving the message signaled from the client, and an adjusting mechanism for adjusting the data transmission amount in reference to the timestamp clock, based on the message.

The present invention is applicable to both audio and video streaming. The present invention will become apparent upon reading the description taken in conjunction with FIGS. 2-4.

DETAILED DESCRIPTION OF THE INVENTION

The present invention provides the client or receiver a method of controlling the receiver buffer fullness by way of shifting the transmission clock. The shifting of the transmission clock effectively modifies Sampling curve, S(t), at the server or sender. According to the present invention, the shifting of the transmission clock is achieved by time-shift signaling by the client or receiver.

As previously mentioned, the sender uses a 'transmission clock' to schedule the packets that it sends to the receiver. The sender would normally try to send at time t the packet whose timestamp is t. There are two opposite actions a receiver may want a sender to take:

1. Send the packets later than their sampling time (i.e., later than the packet timestamp) by an amount of time "alpha". Accordingly, the sender tries at time t to send the packet whose timestamp is t−α. This is analogous to shifting the transmission clock backward by an amount of time "alpha". If the transmission clock was actually decremented (e.g., by a software instruction) by alpha, the sender tries as before the clock shift, to send the packet with timestamp t at the time instant t given by the now-shifted transmission clock. In essence, by shifting the clock backward, one allows the packets to be sent late. This time-shifting action will be hereafter referred to as the backward time-shift.

2. Send the packets earlier than their sampling time (i.e., earlier than the packet timestamp) by an amount of time "beta". Accordingly, the sender should try at time t to send the packet whose timestamp is t+β. This is analogous to shifting the transmission clock forward by an amount of time "beta". If the transmission clock was actually incremented (e.g., by a software instruction) by beta, the sender would try as before the clock shift, to send the packet with timestamp t at the time instant t given by the now shifted transmission clock. In essence, by shifting the clock forward one allows the packets to be early. This time-shifting action will be hereafter referred to as the forward time-shift.

Backward Time-Shift

If the receiver requests backward shift by an amount of time "alpha", the older constraint (R1) is replaced with a new constraint:

$$-\epsilon \leq T(t)-S(t-\alpha) \leq \epsilon' \qquad (R2)$$

or equivalently, $$-\epsilon \leq T(t+\alpha)-S(t) \leq \epsilon'$$

The above equation can be readily understood as "the sender must target to send packet with (sampling) timestamp t at time t+α subject to the constraints "epsilon" and "epsilon_prime". It should be clear that here again epsilon and epsilon_prime may not need to be actual implementation parameters, but are just variables used to model the rate adaptation process. Furthermore, although the constraints are here called epsilon and epsilon_prime both before and after the switch, the constraints generally need not be the same.

Figure 2:
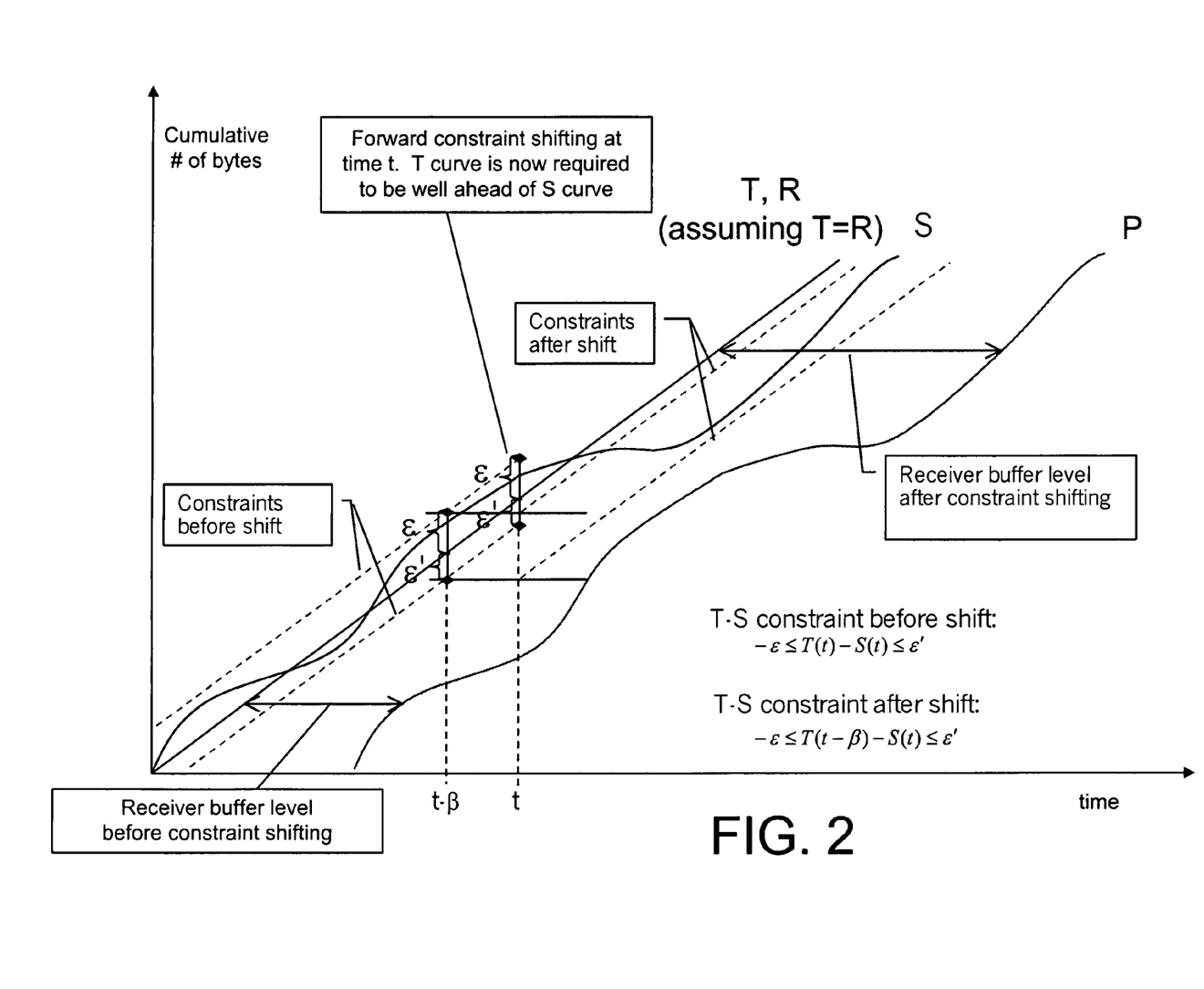
FIG. 2 is a bitrate evolution plot showing the relation between different curves when the receiver switches the transmission curve backward, according to the present invention.

In above model (R2), alpha is assumed to be positive, and the shift in the transmission clock is backward. A backward clock shift is illustrated in FIG. 2. As shown in FIG. 2, a transmission interruption occurs, for example, due to handover. For illustration purposes, the transmission delay is assumed to be zero (i.e., data are received instantly and thus the reception cure R is coincidental to the transmission curve T), even in the duration of the handover (i.e., it is assumed that the sender is able to detect the start of handover immediately and the sender stops sending any more data that would be buffered in the network). The sender receives a backward shift request in the first RTCP (Real Time Control Protocol) report after the handover and it resumes sending data to be buffered in the network. This backward shift of transmission clock allows the server not to constrain the sampling curve to the flat transmission curve (i.e., degrade the quality of the media by using lower source encoding rate), but to maintain it at a higher level compared to the transmission curve. Thus, the backward shift avoids degradation of media quality at the expense of decreasing the receiver buffer level after. The receiver buffer duration is the difference in the time domain between the transmission (i.e., reception) curve and the play-out curve in the time domain.

Forward Time-Shift

If the receiver requests forward shift by an amount of time "beta", the older constraint (R1) is replaced with a new constraint:

$$-\epsilon \leq T(t-\beta)-S(t) \leq \epsilon' \qquad (R3)$$

Figure 3:
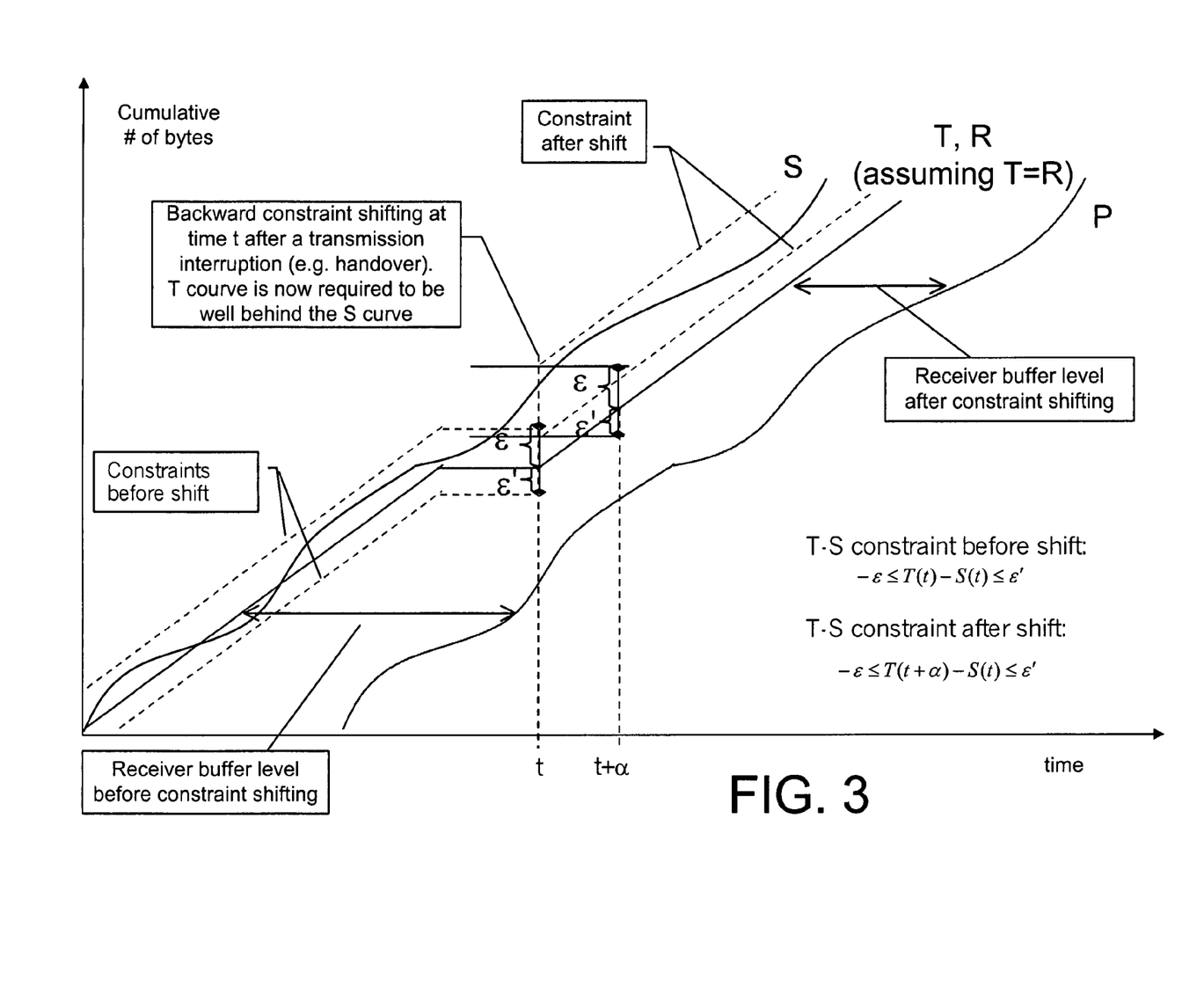
FIG. 3 is a bitrate evolution plot showing the relation between different curves when the receiver switches the transmission curve forward, according to the present invention.

The forward shift is illustrated in FIG. 3. As can be seen from FIG. 3, by requesting a forward shift, the client is able to increase its buffer level effectively.

By being able to shift the transmission clock at the sender, the receiver is able to modify the resulting 'real-timeness' of the stream. There are multiple reasons why this is useful.

Possible Reasons for Backward Time-Shift

Reacting to a handover, the receiver allows the sender to send the packets that could not be sent during the handover when the link is re-established.

The receiver wants to request retransmission for lost packets. It allows the sender to stop its transmission clock while it retransmits the packets.

The receiver is 'slow' (possibly because of clock drift between the sender and the receiver, or the processing load is high in the receiver). It allows the receiver to eliminate the drift between the sender transmission clock and the receiver reception clock.

Possible Reasons for Forward Time-Shift

The receiver wants to increase its buffer level in order to increase tolerance to future handover interruption. This allows the receiver to get the packets ahead of their playout time and later play these packets during the handover.

The receiver wants to increase its buffer level in order to have more time to perform RTP (Real Time Protocol) retransmission, should packets be lost in future.

The receiver is 'fast' (possibly because of clock drift between the sender and the receiver). This allows the receiver to request the sender to send its packets earlier to prevent a buffer underflow.

The list of reasons as given above is not meant to be exhaustive. The time-shift is applicable to any type of media, i.e., audio or video.

Use Case 1: Reacting to Handover

A handover causes the slope of the transmission curve to decrease considerably or to even become completely flat. This is because the sender should adapt its transmission rate to the reception rate, which drops to zero during the handover. For example, after not receiving any RTCP reports for some amount of time, the sender should stop transmitting altogether. The sender will transmit again when it receives a new RTCP packet. The receiver could send an early RTCP packet right after the handover to reinitiate the transmission. Using this invention, this early RTCP packet could be extended with a time-shift command.

In the case where no time-shift command is sent by the receiver to the server, no new data can be sampled during the handover because, the sampling curve should be flat in order to satisfy the model (R1). In other words, real-timeness is maintained at the expense of an outage of data.

Solution: after the handover, the receiver sends a backward time shift (R2). The value of alpha can be derived from the degree of real-time and/or buffer requirements of the receiver. For example, if the receiver does not want to lose any data because of the handover, it could measure the interruption duration and set this value to alpha.

From the receiver point of view, this shift in "real-timeness" may be perceived differently depending on the initial buffering. The receiver may have to re-buffer for an amount up to alpha, if its buffer becomes under-flowed during the handover.

If the receiver has initially buffered enough data in anticipation of a handover, such that the playback can be performed without pause or packet dropping, the receiver only informs the sender after the handover, that the time constraint has been relaxed.

Use Case 2: Reacting to Packet Loss

If the sender retransmits packets over a bandwidth limited channel, the sender has to limit the transmission rate for the original data. The sampling rate has to be adapted to the transmission rate according to model (R1). Retransmitting data could imply that rate adaptation could not be performed, if the number of bytes to retransmit exceeds a certain threshold. For example, if the sender uses bitstream switching as a rate adaptation tool and the resulting transmission rate for the original data is less than the lowest bitstream available at the sender because of retransmission, the sender may not retransmit in order to comply with the rate adaptation constraint.

However, some receivers may want to have packets retransmitted even if it causes some additional delay. Clock shift signaling solves this problem. When the receiver requests in an RTCP packet a series of packet sequence numbers to be retransmitted, the RTCP packet is extended with a (backward) clock shift "alpha". This request signals to the sender that the sender is allowed to relax the real-time constraint by alpha. If the retransmission of all the requested packets is still to break the real-time constraint after the transmission clock is shifted by alpha, the sender would have to resend only some of the retransmitted packets. In that case, the sender can choose to retransmit only the most important packets.

This scenario can be illustrated in the simple case where the sender has a single bitstream and it is not capable of doing any sort of adaptation besides skipping frames. The sender also sends the bitstream at its normal encoding rate, i.e., the transmission curve and the sampling curve are equal. Let us assume that the receiver sends a retransmission request for a burst of packets that have been lost because of a handover, for example. In order to retransmit these packets, the sender would have to increase its transmission rate in order to comply with the rate adaptation constraint. However, in many cases, the transmission rate cannot be increased because it has been adapted to the reception rate. In that case, the sender can use the signaled time amount of alpha to determine how many packets it is able to retransmit.

Use Case 3: Increase Receiver Buffer Level

The receiver wants to increase its buffer level in time so as to avoid future underflow because of handovers, for example.

Assuming, for example, that the server uses bitstream switching, the server could respond to the forward clock-shift request from the receiver by sending a bitstream with a sampling rate lower than the transmission rate. The effect is that the packets would be sent earlier than their timestamp. The sender resumes sending a bitstream with a sampling rate equal to the transmission rate when the requested time-shift by the receiver has been achieved.

Clock-Shift Speed

In addition to signaling to the sender the amount of time shift, alpha or beta, the receiver can also provide the sender with the amount of transition time that is required to change the old constraint (R1) to the new constraint (R2, or R3), i.e., the new time-shifted constraint. Depending on the situation, the receiver may require a different adaptation speed, or in other words, how 'gracefully' the transmission curve and sampling curve should be modified as a result of the clock shift request.

For example, three or more different types of clock-shift requests regarding the transition can be sent to the sender:
Immediate clock-shift
Given speed
No specified speed All of these types of messages need not be implemented by every application. At the beginning of a session, a sender and a receiver may negotiate (or declare/announce) the exact type of clock-shift messages they support, e.g., through 3GPP capability exchange or RTSP signaling.

Immediate Clock-Shift Request

The "immediate" backward shift request may be used, for example, by a slow receiver that wants to prevent the sender from sending more data for a certain amount of time so as to allow the receiver to process the data it already has in its buffer. The typical sender response to such an immediate time-shift would be to stop transmission during the amount of time "alpha", i.e., flatten the transmission curve (see FIG. 2). Increasing the sampling rate is not an acceptable response to an immediate time-shift command.

A receiver may also request an "immediate" clock-shift forward. The effect would be that the sender drops data for the requested duration.

Given Speed Clock-Shift Request

The "given speed" time constraint is typically used by a receiver that wants to increase its buffer level. Although the end-effect of a clock-shift request is a modification of the time constraints at the sender as modeled by (R2 or R3), what the receiver usually requires is a gradual increase or decrease of its receiver buffer. The "given speed" clock-shift request includes at least two time values:

the amount of clock shift (which translates into the time allowed for the increase or decrease of the receiver buffer); and the period of time over which the sender should adapt.

The request instructs the server to increase/decrease the buffer level during a given transition period. For example, if the video frame rate is 10 fps (frame per second) and the client sends a "given speed" request to shift the clock forward (in order to increase its buffer level by 200 ms) with an adaptation time (speed) of one second, the server can translate this command into sending out 12 frames within the next second instead of 10 frames.

As a response to this request, the server can use a combination of transmission rate increase and sampling rate decrease depending on the current transmission rate constraints. The server may first try to increase its transmission rate in order to send the two extra frames. The actual transmission rate can be calculated by the amount of data that has to be sent. If the current channel bandwidth cannot deliver this amount of data, then the server can switch to a bitstream of a lower bitrate and recalculate the transmission rate.

For example, if the bitstream is 10 fps and the bitstream average bitrate is 50 kbps (kilobits per second), assuming each frame is 5 kbits (for simplicity), then the server will need to send 5 k*12=60 kbits within one second in order to send 12 frames. If the channel bandwidth can only support 50 kbps, the next bitstream is 40 kbps and each frame is 4 kbits. Accordingly, in order to send 12 frames, the total amount of data is 4 k*12=48 kbits, which can be easily transmitted through the 50 kbps channel.

To decrease the jitter buffer level, the same type of calculation can be applied. The example given here assumes video data, but the same scheme can be applied to audio data.

The sender is limited when trying to perform the adaptation by:

modification of the transmission curve. The transmission curve is constrained by the reception curve and, thus, the sender may not be able to increase the transmission rate unless it is not using the total available bandwidth;

modification of the sampling curve. This depends on the rate adaptation capability of the sender. For example, if the sender implements bitstream switching and the sender is transmitting at its lowest (or highest) bitstream bitrate, it would not be able to further decrease (or increase) the sampling rate.

When the server receives a "given speed" clock-shift request, it should not try to comply to the request by excessively degrading the media quality (e.g., skipping frames), even if it implies that the server is not able to fully comply with the client request.

"No Specified Speed" Clock-Shift Request

The "no speed" request is typically used by a receiver that wants the server to perform retransmission. Only a single parameter is needed in this request. Unlike the other types of requests (immediate and given speed), the time shift signaled in this request does not signal the target clock-shift by the sender but the maximum allowable clock-shift at the sender.

If the receiver requests retransmission and sends together with the packet request a 'no-speed' clock-shift request of a value "alpha", it means that the sender can introduce up to an amount of time of delay "alpha" between the sampling curve and the transmission curve in order to retransmit the lost packets. The server may introduce a clock shift that is less than alpha if it is sufficient to send the retransmissions.

Formulation of Different Requests

The clock shift requests can be seen as a set of tools that allow the receiver to convey to the sender the following information:

You're allowed to be late by alpha (use of no speed request) if you need to retransmit packets;

Please try to be early by beta (use of given speed request) without degrading the quality (PSNR) too much; or Stop transmitting for "alpha" (use of immediate request).

These are only examples of messages a receiver can send to the sender. By combining the different clock-shift speeds (immediate, given speed, no speed) and the shift direction (backward, forward), there are six different message types to be sent. These messages can be used independently of the data type (audio or video).

Clock Shift Message Format

A. Transport of the Clock Shift Messages

The preferred means of sending the requests is through RTCP. However, other means such as RTSP (Real Time Streaming Protocol) can also be used. In order to use RTCP, new RTCP packet types can be defined or, alternatively, application specific feedback packet can be used.

If there are multiple RTP streams in the session, separate clock shift requests can be sent for each stream (i.e. the receiver is allowed to send different clock shifts for different media). It is also possible to use one medium as the master and the other medium as the slave, i.e. the requests are sent for only one medium (the master) but the clock shift applies to all streams.

If RTSP is used, the shift can be sent on a medium basis or on a session basis (i.e. apply to all the streams in the session).

If unreliable transport is used, the sender may acknowledge the request sent by the receiver, e.g. through an early RTCP packet sent by the sender.

B. Relative vs. Absolute Clock Shift Signaling

The clock-shift value can be sent by the receiver to the sender as a relative time-shift or an absolute time shift. With a relative time shift, the receiver signals to the sender the variation in alpha or beta. For instance, if the clock shift used by the sender at a given time instant t is a one-second forward shift and the receiver signals a relative forward shift of 200 milliseconds, the sender can now change its constraints in order to apply a 1.2 second forward shift.

With an absolute value signaling, the receiver sends to the sender the value of alpha in the constraint (R2) or the value of beta in the constraint (R3) without regards to the previous values it has sent.

All clock shift messages can be expressed in either absolute or relative terms. However, if the receiver wants to send multiple times the same request to the sender for robustness to packet loss, the server should use absolute signaling.

C. Message Content

The packet can include the following fields: the request type (i.e. immediate, given speed or no speed), a 'sign bit' indicating whether the clock shift is forward or backward, the time shift value and the adaptation time for the "given speed" request.

The receiver can also indicate that the sender apply the request multiple times with the given parameters contained in the packet. If this same request is to be applied multiple times by the sender, the packet should also contain a field indicating how many times the shift is to be applied in a row.

D. Sending Time-Shift Ahead of Time

The receiver can send a message to indicate that it does not want to change its current shift but it is signaling a backward shift that the sender could use in the future. In this case, the sender does not respond to the shift command by shifting the clock immediately when receiving the command.

In general, the sender should shift the clock upon receiving a clock-shift request by the receiver. The sender is allowed to shift the clock at a later point of time only if it cannot keep up with the current constraint (in the sense that not keeping the current constraint would cause a serious data outage at the receiver). The sender can use the time shift as a 'no speed' command, i.e. to include as little a time-shift as necessary and only up to the amount signaled by the receiver in order to maintain an acceptable quality at the receiver.

A special case is when the receiver allows the sender to introduce as much time-shift as necessary in order to overcome its transmission problem. This scenario could be used by a receiver that wants to ensure that a handover will not cause any part of the bitstream to be skipped. In the message format, a reserved value for the clock shift can be used to indicate this special case.

E. Combined Signaling of Clock-Shift Request and Signaling of Clock-Shift Ahead of Time The receiver can signal in the same request the requested clock-shift and another clock-shift sent ahead of time as described in the previous example.

Let us illustrate this signaling in simple terms. According to constraint (R1), a sender usually attempts to send at time t the packets whose timestamp is t (subject to some accuracy modeled as epsilon and epsilon_prime). The receiver may like to influence the scheduling (cooperative rate adaptation) of the sender so that, at any time instant t, the sender sends packets of timestamp t+beta. For that purpose, the receiver sends a forward clock-shift message to the sender and possibly specifies a speed to adapt to the new forward constraint "beta".

By the time the sender adapts to the new constraint, the receiver has been able to increase its buffer level by an amount of time "beta" in order to avoid underflow during a handover of length up to beta. After the handover, the sender can shift back to the requested constraint and the receiver buffer will start increasing in order to undergo the next handover without underflow at the receiver. In that situation, the receiver may signal to the sender the following message: if the sender is not able to keep the constraint "beta" because of exceptional events such as a handover, the sender is allowed to go back to the older constraint. Thus the receiver can signal ahead of time to the sender with a message that the sender can go back to the earlier constraint (as if there is no shift in the transmission curve, and packets are sent at their timestamp time) when it is not able to meet the older constraint.

The receiver can send messages to the sender where both the requested clock-shift and another clock-shift sent ahead of time are combined. The sender can shift to the latter only if it cannot maintain the requested request by any acceptable means. The clock shifts may, as always, be expressed in a relative or an absolute manner.

APPLICATION TO ANNEX G IN 3GPP TS 26.234 V5.0.0 (2002-03)

Annex G includes two constraints regarding the playout curve P(t) and the transmission curve T(t):

$P(t) \geq T(t)$, so that the playout is uninterrupted;

$T(t)-P(t) \leq b$ in order to prevent the buffer size from exceeding the pre-decoder, where b is the pre-decoder buffer size in bytes.

If the playout curve is considered as the sampling curve delayed by d, a hypothetical pre-decoder buffer delay in bytes, or $$P(t)=S(t-d)$$

then $$0 \leq T(t)-S(t-d) \leq b \qquad (R4)$$

The above constraint shows that, with a zero-delay network, Annex G allows uninterrupted playout, and the rate adaptation constraints can be very accurately formulated if Annex G is used.

It should be understood that (R4) complies with the more general constraint (R1). This can be demonstrated as follows:

The difference between S(t) and S(t−d) represents the maximum amount of bytes that can be sampled between packets with timestamp (t−d) and packets with timestamp t. The difference is bounded in a real system. Let's call this a bound, i.e., $$S(t) \leq S(t-d)+a$$

and $$S(t) \geq S(t-d).$$

From (R4), the following relation can be derived:

$$-a \leq T(t)-S(t) \leq b,$$

which is equivalent to (R1).

The above constraints show that the concept of time shift can be very well integrated with Annex G. Signaling a time shift from the receiver to the sender will result in the initial condition given by annex G as (R4) is now modified to:

$$0 \leq T(t) - S(t-\alpha-d) \leq b$$

The time-shift can be understood as follows: a change of the Annex G pre-decoder buffer delay to d+α is to increase the pre-decoder buffer, and a change of the Annex G pre-decoder buffer delay to d−β is to decrease the pre-decoder buffer. Here both alpha and beta are positive. The hypothetical pre-decoder buffer constraints still remain unchanged (i.e., between 0 and b). Thus, the same amount of buffer is needed for pre-decoder buffering as before. The shift will result in a change of the total receiver buffer initial delay, and the change in delay is reserved in the receiver buffer for jitter buffering.

Alternative Approach: Byte Shift Signaling

The present invention can be modified so that the change in constraint between the sampling curve and the transmission curve can be signaled in the byte domain rather than in the time domain. In other words, the receiver can send to the sender information indicative of how much it should shift (increase/decrease by a given amount of bytes) its constraints "epsilon" and "epsilon_prime" in the relation (R1). Thus, byte-shift signaling is also within the scope of the present invention.

Capability negotiation can be used to decide whether to use a byte shift request or a time shift request.

Application to 'Non-Adaptive' Senders

In this disclosure, a "non-adaptive" sender refers to a sender that is not able to constrain its sampling rate to its transmission rate. The non-adaptive sender may let the transmission curve and sampling curve diverge from each other with time. With this type of sender, the "real-timeness" of the playout cannot be guaranteed. There is no predictable amount of buffering the receiver can apply to avoid buffer underflow. An example of a "non-adaptive" sender could be a very simple server that would send a pre-encoded bitstream (e.g., 64 kps) at the available transmission rate without making any adaptation to the content. As a result, the sampling curve may deviate from the transmission curve by a large amount. This type of sender's behavior is very hard to handle by the receiver. With this type of senders, the receiver cannot rely on clock shift messages as a way to modify the constraints between the sampling curve and the transmission curve. However, the receiver is still able to influence the shaping of the sampling curve to some extent.

For example, the non-adaptive server can react to the forward time-shift by trying to send packets ahead of their schedule time. Likewise, the non-adaptive server can react to the backward time shift by trying to send packets later than their scheduled time. The shaping of the sampling curve by the receiver via receiver clock shift request is expected to be less accurate with a non-adaptive sender than the shaping of the sample curve with an adaptive sender.

Figure 4:
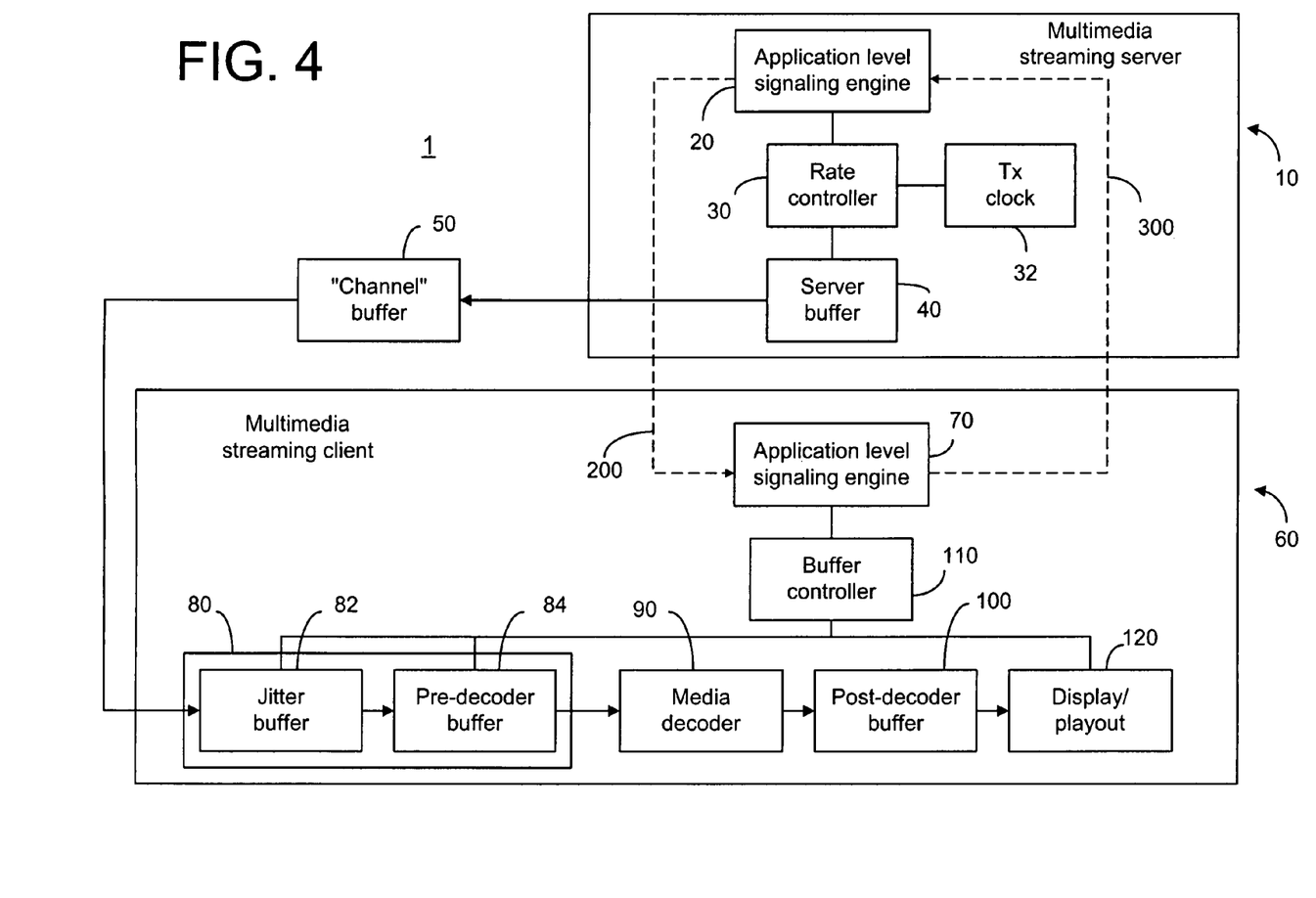
FIG. 4 is a block diagram showing a multimedia streaming system having a server device and a client device that can perform the rate adaptation method, according to the present invention.

FIG. 4 is a block diagram illustrating a multimedia streaming system 1 according to the present invention, in which means are provided for signaling time-shift related parameters from a streaming client 60 to a streaming server 10.

The streaming server 10 comprises an application level signaling engine 20, a rate controller 30 and a server buffer 40. The streaming client 60 comprises an application level signaling engine 70, corresponding to, and adapted to communicate with, the application level signaling engine 20 in the streaming server 10. It further comprises a client buffer 80 which, in the embodiment of the invention illustrated in FIG. 4, comprises a jitter buffer 82 and a pre-decoding buffer 84, integrated as a single unit. In other embodiments of the invention, streaming client 60 may include a jitter buffer and a pre-decoding buffer that are implemented separately. The streaming client further comprises a media decoder 90, a post-decoder buffer 100, a buffer controller 110 and a display/play-out device 120.

The system depicted in FIG. 4 is further shown to comprise a "channel buffer" 50 located between streaming server 10 and streaming client 60, representing the varying transfer delay that occurs during transmission of data packets from the streaming server to the client.

The application level signaling engine 20 of the streaming server is adapted to transmit recommended buffering parameters to the streaming client, as denoted by reference numeral 200 in FIG. 4. These parameters, including, for example, an indication of an initial pre-decoder buffering time or pre-decoder buffer size, are transmitted from multimedia streaming server 10 to client 60 using the Real Time Streaming Protocol (RTSP).

The server's rate controller 30 is operative to adapt the rate at which media data is transmitted from the streaming server. The server also has a transmission clock 32 to timestamp the packets to be transmitted to the client. It operates by adjusting the transmitted data rate in accordance with the varying bit-rate on the transmission channel, taking into account the client's request for a transmission time-shift, thereby seeking to avoid pauses in play-back at the client due to pre-decoder buffer underflow or dropping packets at the client due to buffer overflow.

Server buffer 40 stores data packets temporarily before they are transmitted from the streaming server across the transmission channel to streaming client 60. In a "live" streaming scenario where data packets are sampled real-time, the server buffer is indeed a physical buffer where data packets are placed at sampling time and are extracted at transmission time. In a "pre-encoded" streaming scenario, where data packets are not sampled real-time but are stored in a pre-encoded file and are read from the file at transmission time, the server buffer is a virtual buffer that represents the difference between sampling time (with reference to a sampling clock started at the streaming server when the first data packet of the pre-encoded file is transmitted) and transmission time of data packets.

At the streaming client, media data is received from the transmission channel and buffered in client buffer 80. The parameters of pre-decoder buffer 84 and jitter buffer 82 are set by the buffer controller 110. The parameters are chosen as an aggregate of the server recommended pre-decoder buffering parameters and the additional buffering required estimated by the client. The client estimates what is needed to tolerate the expected packet transfer delay variation (i.e. jitter) on the available transmission channel. Such aggregate is constrained by the maximum buffering capabilities of the client. Media decoder 90 extracts media data from the client buffer and decodes the media data in a manner appropriate for media type in question. It should be appreciated that the media data will, in general, comprise a number of different media types. For example, if the media data transmitted from the server is representative of a video sequence, it is likely to comprise at least an audio component in addition to video data. It should therefore be understood that media decoder 90, as illustrated in FIG. 4, may actually comprise more than one decoder, for example a video decoder implemented according to a particular video coding standard and an associated audio decoder. As the media data is decoded by media decoder 90, it is output to post-decoder buffer 100 where it is stored temporarily until its scheduled play-out time, at which point it is passed from the post-decoder buffer to display/play-out device 120 under the control of buffer controller 110.

According to the invention, buffer controller 110 is adapted to provide an indication of the client's desired time-shift to the application level signaling engine 70.

The application level signaling engine is, in turn, adapted to transmit an indication of the client's desired time-shift related parameters to the streaming server, as denoted by reference numeral 300 in FIG. 4.

Advantages of the Present Invention:

A. The prior art methods (RTSP headers and bitrate switching) have severe limitations:

PLAY is not meant to be manipulated for buffer control, but rather to translate user requests from the client to the server.

The response to a new PLAY with Range request is expected to be synchronized with the actual play position at the time the server receives the request (i.e., skipping or re-sending of data is possible).

RTSP over TCP may show too much delay to be useful, especially in 3 GPP PSS as it is sent on a different bearer from the RTP stream.

Modifying the transmission rate, as requested by the client through RTSP SPEED, may often not be possible at all, as the transmission rate needs to be adapted to the available bitrate.

It operates in the bitrate domain, which cannot be directly mapped by the receiver to time domain (i.e., the amount of time it will take for the receiver to play back a given amount of data). This is because the sampling curve is usually not a straight line.

There might not be a bit stream rate that matches the NW bit rate.

The client doesn't know how much of the receiver buffer level decrease/increase is due to variation of the bitrate within the given bitstream or due to accumulation of difference between the bitstream average rate and the transmission rate.

Conflict exists between sampling curve shaping decisions made at the sender and the receiver because there is no separation of the server and client tasks. This is to be contrasted with the clock shift signaling whereby a clear division of the sender and the receiver responsibilities occurs. The receiver only modifies the constraints on the curves while the sender does the actual shaping of the curves in order to meet the constraints.

B. Advantages of the time shift signaling according to the present invention:

It can be carried in RTCP RR reports (e.g., application specific extension).

The receiver gives only some targets for the sampling curve (i.e., control where the sampling curve should be with respect to the transmission curve), it is up to the sender to shape the actual curves to reach this target.

It can be mapped to 3 GPP TS 26.234 Annex G video buffering constraints.

Sender can adapt either of the sampling curve and the transmission curve (or both) to comply with the constraint shift request.

It should be noted that while some implementations may try to strictly enforce these constraints by choosing some constants "epsilon" and "epsilon_prime", other applications may not guarantee strict upper bounds and lower bounds, but just minimize the difference between T(t) and S(t) as much as possible.

It is important to recognize that a server that is performing the rate adaptation process in order to achieve 'real-timeness' may be implemented in a variety of ways. It may, in particular, not have been programmed using the notions of transmission curve and sampling curve and may thus not compute these curves in real-time. However, this does not restrict the applicability of the present invention. If one can log (for example, using a network analyzer) the packets sent by the server and then compute and plot the sampling curve and transmission curve derived from the packet log, then one can observe the relation (R1).

The present invention relates to real-time multimedia systems, whether or not the system is actually implemented using curve computation.

Although the invention has been described with respect to a preferred embodiment thereof, it will be understood by those skilled in the art that the foregoing and various other changes, omissions and deviations in the form and detail thereof may be made without departing from the scope of this invention.

What is claimed is:

1. A method for adaptively controlling level of a receiver buffer in a client in a multimedia streaming network, the streaming network comprising a server for providing streaming data to the client, said method comprising:

signaling to the server a message indicative of the receiver buffer level, wherein the receiver buffer is used to compensate for difference between data transmission amount by the server and data usage amount by the client so as to allow the client to have sufficient amount of streaming data to play-out in a non-disruptive manner, and wherein the data transmission amount by the server is determined at least partially by a timestamp clock in the server for data transmission scheduling; and adjusting at the server the data transmission amount in reference to the timestamp clock, based on the message, wherein the message comprises a time-shift message indicative of an effective time-shift on the timestamp clock so as to allow the server to adjust the data transmission amount in reference to the time-shifted timestamp clock.

2. The method of claim 1, wherein the time-shift is in a direction to cause a decrease in the level in the receiver buffer.

3. The method of claim 1, wherein the time-shift is in a direction to cause an increase of the level in the receiver buffer.

4. The method of claim 1, wherein the message is further indicative of when the effective time-shift takes place.

5. The method of claim 1, wherein the message is further indicative of a request for an immediate time-shift.

6. The method of claim 1, wherein the message is further indicative of a period of time for achieving the time-shift.

7. The method of claim 1, wherein the message is further indicative of a maximum amount of the time-shift.

8. The method of claim 1, wherein the data transmission amount is also determined by a sampling rate in the server, and the message is used to change the sampling rate in the server so as to change the data transmission amount provided to the client.

9. The method of claim 1, wherein the message comprises a byte-shift message indicative of a change of streaming data amount so as to allow the server to adjust the data transmission amount.

10. The method of claim 1, wherein the message comprises a request sent via Real Time Control Protocol.

11. The method of claim 1, wherein the message comprises a request sent via Real Time Streaming Protocol.

12. A multimedia streaming network comprising:
at least a client; and
a server for providing streaming data to the client, the client comprising:
a receiver buffer to compensate for difference between data transmission amount by the server and data usage amount by the client so as to allow the client to have sufficient amount of streaming data to play-out in a non-disruptive manner, and wherein the data transmission amount by the server is determined at least partially by a timestamp clock in the server for data transmission scheduling, and
a signaling mechanism for signaling to the server a message indicative of the receiver buffer level; and
the server comprising:
a further signaling mechanism for receiving the message signaled from the client, and an adjusting mechanism for adjusting the data transmission amount in reference to the timestamp clock, based on the message, wherein the message comprises a time-shift message indicative of an effective time-shift on the timestamp clock so as to allow the server to adjust the data transmission amount in reference to the time-shifted timestamp clock.

13. The multimedia streaming network of claim 12, wherein the message comprises a byte-shift message indicative of a change of streaming data amount so as to allow the server to adjust the data transmission amount.

14. A client device in a multimedia streaming network, comprising:
a receiving mechanism for receiving data transmission amount provide by a server in the multimedia streaming network;
a receiver buffer to compensate for difference between data transmission amount by the server and data usage amount by the client device so as to allow the client device to have sufficient amount of streaming data to play-out in a non-disruptive manner, and
wherein the data transmission amount by the server is determined at least partially by a timestamp clock in the server for data transmission scheduling, and a signaling mechanism for signaling to the server a message indicative of the receiver buffer level so as to allow the server to adjust the data transmission amount based on the message, wherein the message comprises a time-shift message indicative of an effective time-shift on the timestamp clock so as to allow the server to adjust the data transmission amount in reference to the time-shifted timestamp clock.

15. The client device of claim 14, wherein the time-shift is in a direction to cause a decrease in the level in the receiver buffer.

16. The client device of claim 14, wherein the time-shift is in a direction to cause an increase of the level in the receiver buffer.

17. The client device of claim 14, wherein the message is further indicative of when the effective time-shift takes place.

18. The client device of claim 14, wherein the message is further indicative of a request for an immediate time-shift.

19. The client device of claim 14, wherein the data transmission amount is also determined by a sampling rate in the server, and the message is used to change the sampling rate in the server so as to change the data transmission amount provided to the client.

20. The client device of claim 14, wherein the message comprises a byte-shift message indicative of a change of streaming data amount so as to allow the server to adjust the data transmission amount.

21. A server device in multimedia streaming network, comprising:
a transmitting mechanism for providing streaming data in a data transmission amount to a client in the multimedia streaming network;
a signaling mechanism for receiving a message provided by the client, wherein the client has a receiver buffer to compensate for difference between the data transmission amount by the client so as to allow the client to have sufficient amount of streaming data to play-out in a non-disruptive manner, and wherein the data transmission amount by the server is determined at least partially by a timestamp clock in the server for data transmission scheduling, and wherein the message is indicative of the receiver buffer level; and
an adjusting mechanism, responsive to the message, for adjusting the data transmission amount in reference to the timestamp clock, wherein the message comprises a time-shift message indicative of an effective time-shift on the timestamp clock so as to allow the server device to adjust the data transmission amount in reference to the time-shifted timestamp clock.

22. The server device of claim 21, wherein the data transmission amount is also determined by a sampling rate in the server, and the message is used to change the sampling rate in the server so as to change the data transmission amount provided to the client.

23. The server device of claim 21, wherein the message comprises a byte-shift message indicative of a change of streaming data amount so as to allow the server device to adjust the data transmission amount.

* * * * *